United States Patent
Zhou

(10) Patent No.: US 9,893,949 B2
(45) Date of Patent: Feb. 13, 2018

(54) CONTROL CONFLICT MANAGEMENT IN FORWARDING NODES

(71) Applicant: Huawei Technologies Co., Ltd., Shenzhen, Guangdong (CN)

(72) Inventor: Wei Zhou, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 73 days.

(21) Appl. No.: 14/980,958

(22) Filed: Dec. 28, 2015

(65) Prior Publication Data

US 2016/0134483 A1 May 12, 2016

Related U.S. Application Data

(63) Continuation of application No. PCT/CN2013/077865, filed on Jun. 25, 2013.

(51) Int. Cl.
*H04L 12/24* (2006.01)
*H04L 12/64* (2006.01)
*H04W 76/04* (2009.01)

(52) U.S. Cl.
CPC .......... *H04L 41/12* (2013.01); *H04L 12/6418* (2013.01); *H04W 76/041* (2013.01)

(58) Field of Classification Search
CPC ... H04L 41/12; H04L 12/6418; H04W 76/041
See application file for complete search history.

(56) References Cited

U.S. PATENT DOCUMENTS

| 7,990,993 B1 | 8/2011 | Ghosh et al. |
| 2012/0093158 A1 | 4/2012 | Chiba |
| 2013/0007286 A1* | 1/2013 | Mehta ................ H04W 76/02 709/227 |
| 2013/0058215 A1* | 3/2013 | Koponen ............ H04L 12/4633 370/241 |
| 2013/0103817 A1 | 4/2013 | Koponen et al. |
| 2015/0058922 A1 | 2/2015 | Xia et al. |

FOREIGN PATENT DOCUMENTS

| CN | 102763371 A | 10/2012 |
| CN | 102857987 A | 1/2013 |
| CN | 102946325 A | 2/2013 |
| CN | 102984058 A | 3/2013 |
| WO | WO 2013/031175 A1 | 3/2013 |

* cited by examiner

*Primary Examiner* — Ricky Ngo
*Assistant Examiner* — Stephen Steiner

(57) ABSTRACT

Embodiments of the present invention provide a processing method of a forwarding node. The method includes: receiving, by a forwarding node, a request message sent by a control node, where the request message is used to request to control the forwarding node; determining, by the forwarding node, that a control conflict exists or the control conflict does not exist; and if the control conflict exists, sending, by the forwarding node, a request rejection response message to the control node, so that the control node selects another forwarding node; or if the control conflict does not exist, sending, by the forwarding node, a request acceptance response message to the control node. In the embodiments of the present invention, control conflicts can be avoided.

14 Claims, 6 Drawing Sheets

CONTROL CONFLICT MANAGEMENT IN FORWARDING NODES

CROSS-REFERENCE TO RELATED APPLICATIONS

This application is a continuation of International Application No. PCT/CN2013/077865, filed on Jun. 25, 2013, which is hereby incorporated by reference in its entirety.

TECHNICAL FIELD

The present invention relates to the field of communications technologies, and in particular, to a processing method of a forwarding node, a forwarding node and a control node.

BACKGROUND

An EPS (evolved packet system) includes two parts, which are an access network and a core network, and a system architecture in a non-roaming scenario is shown in FIG. 1. A radio access network of the EPS is an evolved universal terrestrial radio access network (E-UTRAN), which is configured to implement all functions related to evolved network radio part. Key logical network elements of the core network include a mobility management entity (MME), a serving gateway (S-GW) and a packet data network gateway (P-GW). The MME mainly completes processing of signaling-plane functions, for example, user authentication and switching, and mobility management and bearer management of an idle-state terminal. The S-GW is a user-plane function entity for completing routing and forwarding of packet data, and is used as a data anchor in a 3GPP system to terminate an interface of the E-TURAN; and is additionally a local mobility management anchor in an E-TURAN handover scenario in a geographic region. The P-GW is a gateway connected to an external data network, and is a user-plane anchor between a 3GPP access network and a non-3GPP access network. User equipment may access external packet data networks (PDN) by connecting to a PDN link created by the P-GW. These PDNs may be the Internet, a virtual private network (VPN), an IP multimedia service (INS) network, or a Wireless Application Protocol (WAP) network that is provided by an operator. In actual network deployment, logical network elements S-GW and P-GW may be separated or may be integrated; and with a few exceptions (for example, roaming), the logical network elements S-GW and P-GW are integrally deployed.

OpenFlow reconstructs conventional physically fixed hardware into a dynamically variable software-defined networking (SDN), implementing separation between a control plane and a forwarding plane. When an SDN architecture is introduced into an SAE network, a control-plane function and a forwarding-plane function that are of a gateway may be separated from each other, and therefore an architecture shown in FIG. 2 can be obtained.

It can be seen from the figure that the control plane and the forwarding plane that are of the gateway have been separated from each other, the control plane of the gateway may decide a data processing rule related to the user equipment (UE), that is, a flow table, and send the flow table to the forwarding plane of the gateway by using an interface (for example, an OpenFlow interface) between the control plane and the forwarding plane; and the forwarding plane of the gateway implements processing of a data packet of the user equipment (UE) according to the rule.

In the SAE network, a gateway includes an SGW and a PGW. Therefore, after control and forwarding are separated, there may be two roles on both the control plane and the forwarding plane. For example, on the control plane, the roles may be an SGW-C and a PGW-C, and in addition, on the forwarding plane, the roles may be an SGW-U and a PGW-U. During deployment in an actual network, separated deployment or integrated deployment may be performed on control planes and forwarding planes as required.

In the prior art, when integrated deployment is performed on forwarding planes, but separated deployment is performed on control planes, that multiple control gateways control a same forwarding gateway is caused, which probably results in a control policy conflict, and affects a normal forwarding function of the gateway.

SUMMARY

To achieve the foregoing objectives, embodiments of the present invention provide a processing method of a forwarding node, to avoid a problem that when separated deployment is performed on control planes but integrated deployment is performed on forwarding planes in a serving gateway and a data gateway, a conflict is generated among control policies accepted after a packet enters the forwarding planes.

According to a first aspect, an embodiment of the present invention provides a processing method of a forwarding node, where the method includes:

receiving, by a forwarding node, a request message sent by a control node, where the request message is used to request to control the forwarding node;

determining, by the forwarding node, that a control conflict exists or the control conflict does not exist; and if the control conflict exists, sending, by the forwarding node, a request rejection response message to the control node, so that the control node selects another forwarding node; or if the control conflict does not exist, sending, by the forwarding node, a request acceptance response message to the control node.

Based on the first aspect, in a first possible implementation manner, the determining, by the forwarding node, that a control conflict exists includes:

when the forwarding node determines that the forwarding node is controlled by another control node, determining, by the forwarding node, that the control conflict exists.

Based on the first possible implementation manner of the first aspect, in a second possible implementation manner, when the forwarding node is controlled by the other control node, the determining, by the forwarding node, that the control conflict exists includes:

when the forwarding node is controlled by the another control node, and the control node and the other control node serve a same user, determining, by the forwarding node, that the control conflict exists.

Based on the first aspect, or the first possible implementation manner of the first aspect, or the second possible implementation manner of the first aspect, in a third possible implementation manner, the determining, by the forwarding node, that the control conflict does not exist includes:

when the forwarding node determines that the forwarding node is not controlled by another control node, determining, by the forwarding node, that the control conflict does not exist.

Based on the first aspect, or the first possible implementation manner of the first aspect, or the second possible implementation manner of the first aspect, in a fourth possible implementation manner, the determining, by the forwarding node, that the control conflict does not exist includes:

when the forwarding node determines that the forwarding node is controlled by the other control node, if the control node and the other control node do not serve the same user, determining, by the forwarding node, that the control conflict does not exist.

Based on the first aspect, or the first possible implementation manner of the first aspect, or the second possible implementation manner of the first aspect, in a fifth possible implementation manner, the determining, by the forwarding node, that the control conflict does not exist includes:

when the forwarding node and the other forwarding node can coexist, determining, by the forwarding node, that the control conflict does not exist.

According to a second aspect, an embodiment of the present invention provides a processing method of a forwarding node, including:

sending, by a control node, a request message to a forwarding node, where the request message is used to request to control the forwarding node;

receiving, by the control node, a request rejection response message sent by the forwarding node, where the request rejection response message includes information about another control node that controls the forwarding node;

determining, by the control node according to the information about the other control node, whether a control conflict exists with the other control node; and if the control node determines that the control conflict exists with the other control node, sending, by the control node, the request message to another forwarding node.

Based on the second aspect, in a first possible implementation manner, the method further includes:

if the control node determines that the control conflict does not exist with the other control node, sending, by the control node, indication information indicating that the control conflict does not exist between the control node and the other control node to the forwarding node, so that the forwarding node accepts control from the control node.

Based on the second aspect or the first possible implementation manner of the second aspect, in a second possible implementation manner, the determining, by the control node according to the information about the other control node, whether a control conflict exists with the other control node includes:

determining, by the control node according to the information about the other control node, whether the control node and the other control node serve a same user; and if they serve the same user, determining that the control conflict exists between the control node and the other control node; or if they do not serve the same user, determining that the control conflict does not exist between the control node and the other control node.

Based on the second aspect or the first possible implementation manner of the second aspect, in a third possible implementation manner, the determining, by the control node according to the information about the other control node, whether a control conflict exists with the other control node includes:

determining, by the control node according to the information about the other control node, whether the control node and the other control node can coexist; and if they cannot coexist, determining that the control conflict exists between the control node and the other control node; or if they can coexist, determining that the control conflict does not exist between the control node and the other control node.

According to a third aspect, an embodiment of the present invention provides a forwarding node, where the forwarding node includes:

a request message receiving unit, configured to receive a request message sent by a control node, where the request message is used to request to control the forwarding node;

a control conflict determining unit, configured to determine that a control conflict exists or the control conflict does not exist; and a response message sending unit, configured to:

if the control conflict exists, send a request rejection response message to the control node, so that the control node selects another forwarding node; or if the control conflict does not exist, send a request acceptance response message to the control node.

Based on the third aspect, in a first possible implementation manner, the control conflict determining unit is configured to:

when the forwarding node determines that the forwarding node is controlled by another control node, determine that the control conflict exists.

Based on the first possible implementation manner of the third aspect, in a second possible implementation manner, the control conflict determining unit is configured to:

when the forwarding node is controlled by the other control node, and the control node and the other control node serve a same user, determine that the control conflict exists.

Based on the third aspect, or the first possible implementation manner of the third aspect, or the second possible implementation manner of the third aspect, in a third possible implementation manner, the control conflict determining unit is configured to:

when the forwarding node determines that the forwarding node is not controlled by another control node, determine that the control conflict does not exist.

Based on the third aspect, or the first possible implementation manner of the third aspect, or the second possible implementation manner of the third aspect, in a fourth possible implementation manner, the control conflict determining unit is configured to:

when the forwarding node determines that the forwarding node is controlled by the other control node, if the control node and the other control node do not serve the same user, determine that the control conflict does not exist.

Based on the third aspect, or the first possible implementation manner of the third aspect, or the second possible implementation manner of the third aspect, in a fifth possible implementation manner, the control conflict determining unit is configured to:

when the forwarding node and the other forwarding node can coexist, determine that the control conflict does not exist.

According to a fourth aspect, an embodiment of the present invention provides a control node, where the control node includes:

a request message sending unit, configured to send a request message to a forwarding node, where the request message is used to request to control the forwarding node;

a response message receiving unit, configured to receive a request rejection response message sent by the forwarding node, where the request rejection response message includes information about another control node that controls the forwarding node; and a control conflict determining unit, configured to determine, according to the information about the other control node, whether a control conflict exists with the other control node, where if the control node determines that the control conflict exists with the other control node, the control node sends the request message to another forwarding node by using the request message sending unit.

Based on the second aspect, in a first possible implementation manner, the control node further includes an indication information sending unit, configured to:

if the control node determines that the control conflict does not exist with the other control node, send, indication information indicating that the control conflict does not exist between the control node and the other control node to the forwarding node, so that the forwarding node accepts control from the control node.

Based on the fourth aspect or the first possible implementation manner of the fourth aspect, in a second possible implementation manner, the control conflict determining unit is configured to determine, according to the information about the other control node, whether the control node and the other control node serve a same user; and if they serve the same user, determine that the control conflict exists between the control node and the other control node; or if they do not serve the same user, determine that the control conflict does not exist between the control node and the other control node.

Based on the fourth aspect or the first possible implementation manner of the fourth aspect, in a third possible implementation manner, the control conflict determining unit is configured to:

determine, according to the information about the other control node, whether the control node and the other control node can coexist; and if they cannot coexist, determine that the control conflict exists between the control node and the other control node; or if they can coexist, determine that the control conflict does not exist between the control node and the other control node.

According to a fifth aspect, an embodiment of the present invention provides a forwarding node, where the forwarding node includes a network interface, a memory and a processor, where the network interface is configured to communicate with another network element; and the processor invokes an application program physically stored in the memory, to execute an instruction of the following process:

receiving, by using the network interface, a request message sent by a control node, where the request message is used to request to control the forwarding node; and determining that a control conflict exists or the control conflict does not exist; and if the control conflict exists, sending a request rejection response message to the control node by using the network interface, so that the control node selects another forwarding node; or if the control conflict does not exist, sending a request acceptance response message to the control node by using the network interface.

Based on the fifth aspect, in a first possible implementation manner, the determining, by the processor, that a control conflict exists includes:

when the forwarding node determines that the forwarding node is controlled by another control node, determining, by the processor, that the control conflict exists.

Based on the first possible implementation manner of the fifth aspect, in a second possible implementation manner, when the forwarding node is controlled by the other control node, the determining, by the processor, that the control conflict exists includes:

when the forwarding node is controlled by the other control node, and the control node and the other control node serve a same user, determining, by the processor, that the control conflict exists.

Based on the fifth aspect, or the first possible implementation manner of the fifth aspect, or the second possible implementation manner of the fifth aspect, in a third possible implementation manner, the determining, by the processor, that the control conflict does not exist includes:

when the forwarding node determines that the forwarding node is not controlled by another control node, determining, by the processor, that the control conflict does not exist.

Based on the fifth aspect, or the first possible implementation manner of the fifth aspect, or the second possible implementation manner of the fifth aspect, in a fourth possible implementation manner, the determining, by the processor, that the control conflict does not exist includes:

when the forwarding node determines that the forwarding node is controlled by the other control node, if the control node and the other control node do not serve the same user, determining, by the processor, that the control conflict does not exist.

Based on the fifth aspect, or the first possible implementation manner of the fifth aspect, or the second possible implementation manner of the fifth aspect, in a fifth possible implementation manner, the determining, by the processor, that the control conflict does not exist includes:

when the forwarding node and the other forwarding node can coexist, determining, by the processor, that the control conflict does not exist.

According to a sixth aspect, an embodiment of the present invention provides a control node, where the control node includes a network interface, a memory and a processor, where the network interface is configured to communicate with another network element; and the processor invokes an application program physically stored in the memory, to execute an instruction of the following process:

sending a request message to a forwarding node by using the network interface, where the request message is used to request to control the forwarding node;

receiving, by using the network interface, a request rejection response message sent by the forwarding node, where the request rejection response message includes information about another control node that controls the forwarding node;

determining, according to the information about the other control node, whether a control conflict exists with the other control node; and if determining that the control conflict exists with the other control node, sending the request message to another forwarding node by using the network interface.

Based on the sixth aspect, in a first possible implementation manner, if determining that the control conflict does not exist with the other control node, the processor sends, by using the network interface, indication information indicating that the control conflict does not exist between the control node and the other control node to the forwarding node, so that the forwarding node accepts control from the control node.

Based on the sixth aspect or the first possible implementation manner of the sixth aspect, in a second possible implementation manner, the determining, by the processor according to the information about the other control node, whether a control conflict exists with the other control node includes:

determining, by the processor according to the information about the other control node, whether the control node and the other control node serve a same user; and if they serve the same user, determining that the control conflict exists between the control node and the other control node; or if they do not serve the same user, determining that the control conflict does not exist between the control node and the other control node.

Based on the sixth aspect or the first possible implementation manner of the sixth aspect, in a third possible implementation manner, the determining, by the processor according to the information about the other control node, whether a control conflict exists with the other control node includes:

determining, by the processor according to the information about the other control node, whether the control node and the other control node can coexist; and if they cannot coexist, determining that the control conflict exists between the control node and the other control node; or if they can coexist, determining that the control conflict does not exist between the control node and the other control node.

According to the processing method of a forwarding node provided in the embodiments of the present invention, by means of selecting different forwarding planes for gateway control planes that cannot coexist, a problem can be avoided that when separated deployment is performed on control planes but integrated deployment is performed on forwarding planes in a serving gateway and a data gateway, a conflict is generated among control policies accepted after a packet enters the forwarding planes.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following further describes exemplary embodiments of the present invention with reference to the accompanying drawings.

Core information, including a match field (match field), a counter (counters) and an instruction set, is stored in a flow table, to implement functions such as searching, forwarding, statistics collection and filtration. The match field of the flow table includes an input interface, a data packet header, and metadata (metadata) that is determined by a previous flow table.

In an evolved system, a manner of processing an uplink data packet by using an instruction set in a flow table delivered by a control plane of an S-GW to a forwarding plane is generally sending the uplink data packet to a P-GW after decapsulation and encapsulation. However, in a flow table delivered by a control plane of the P-GW, a manner of processing an uplink data packet is externally sending the uplink data packet after decapsulation. In the flow table delivered by a control plane of the P-GW, a manner of processing a downlink data packet is sending the downlink data packet to the S-GW after encapsulation, and a manner of processing a downlink data packet by using an instruction in the flow table delivered by the control plane of the S-GW is decapsulating and then encapsulating the downlink data packet. Therefore, after a data packet of a same user enters a same forwarding plane or a same forwarding node, the data packet likely matches flow tables delivered by different control planes; however, because the different flow tables process the data packet in different manners, a conflict is caused.

Figure 1:
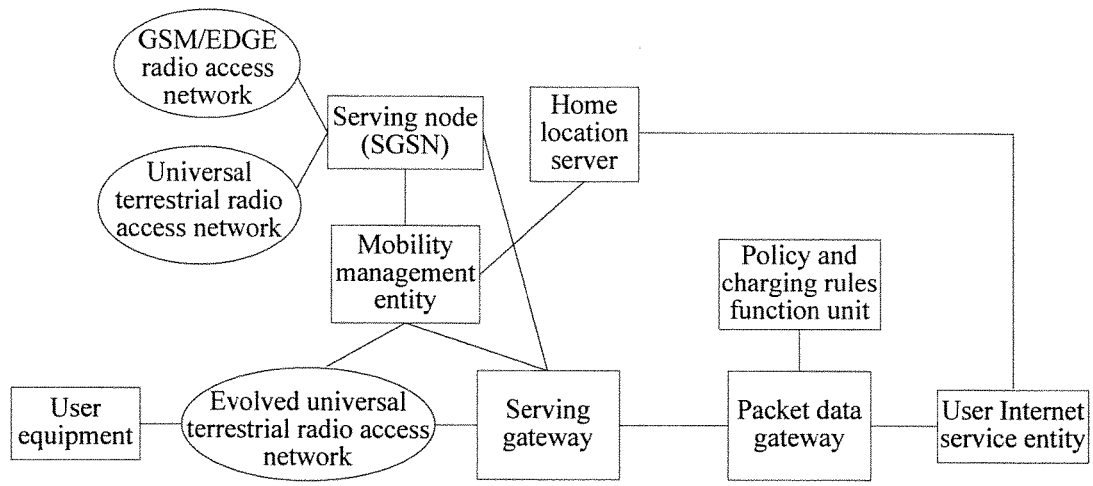
FIG. 1 is a system structural diagram of an evolved packet system.
Figure 2:
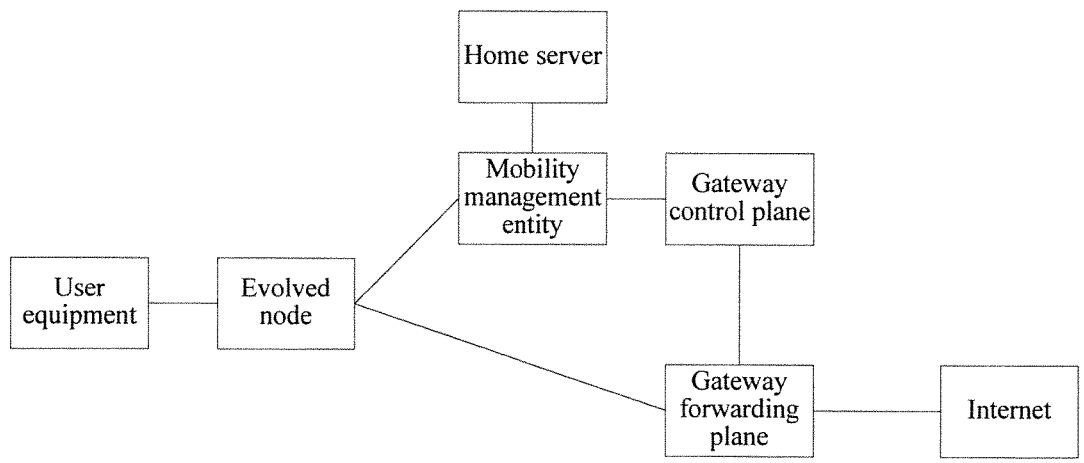
FIG. 2 is a schematic diagram of an architecture of an evolved packet system in which a control-plane function and a forwarding-plane function of a gateway are separated.
Figure 3:
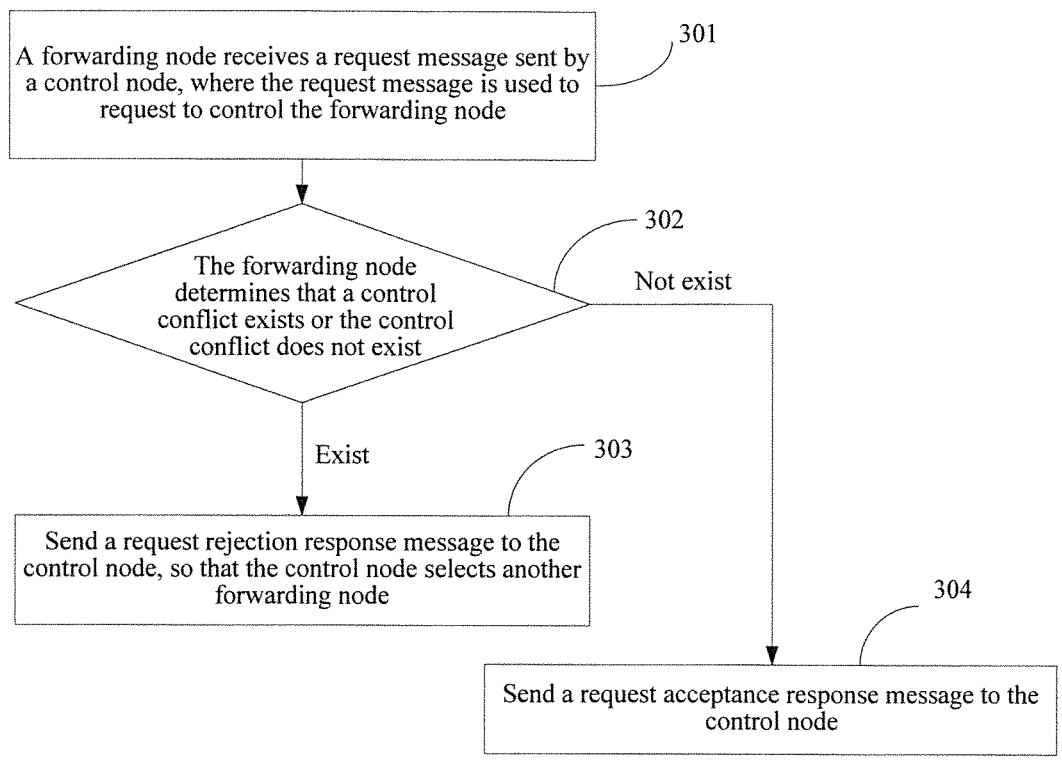
FIG. 3 is a flowchart of an embodiment of a processing method of a forwarding node according to an embodiment of the present invention.

Therefore, in a first embodiment of the present invention, a processing method of a forwarding node is provided. In this embodiment, the method is executed by a forwarding plane of a gateway. As shown in FIG. 3, the method includes:

301: A forwarding node receives a request message sent by a control node, where the request message is used to request to control the forwarding node.

Specifically, the control node may request to control the forwarding node by means of sending a registration request, or the like. If the forwarding node accepts the control request from the control node, the forwarding node receives a flow table delivered by the control node, and performs, according to the flow table delivered by the control node, a further action on a packet that enters the forwarding node.

302: The forwarding node determines that a control conflict exists or the control conflict does not exist.

Specifically, the forwarding node may determine, according to whether the forwarding node has been controlled by another control node, whether the control conflict exists on the forwarding node; or may determine, according to whether a control node that controls the forwarding node and the control node that sends the current request message serve a same user, whether the control conflict exists.

More specifically, in the former determining rule, when the forwarding node determines that the forwarding node is controlled by another control node, the forwarding node determines that the control conflict exists; or when the forwarding node determines that the forwarding node is not controlled by another control node, the forwarding node determines that the control conflict does not exist.

In the latter determining rule, when the forwarding node is controlled by another control node, and the control node and the other control node serve a same user, the forwarding node determines that the control conflict exists; or when the forwarding node determines that the forwarding node is controlled by another control node, if the control node and the other control node do not serve a same user, the forwarding node determines that the control conflict does not exist.

In addition, when the forwarding node and another forwarding node can coexist, the forwarding node may also determine that the control conflict does not exist.

In this step, the forwarding node may determine whether the control conflict exists between the control node that sends the current request message and another control node, and then step 303 or 304 is performed.

303: If the control conflict exists, the forwarding node sends a request rejection response message to the control node, so that the control node selects another forwarding node.

Specifically, if discovering that the control conflict exists on the forwarding node, the current forwarding node selects rejecting a request from the control node, and then the control node may select sending a request message to another forwarding node in a network.

Alternatively,

304: if the control conflict does not exist, the forwarding node sends a request acceptance response message to the control node.

Specifically, if the control conflict does not exist on the current forwarding node, the current forwarding node accepts a control request from the control node that currently sends the request message, and then receives a flow table delivered by the control node; and performs an action corresponding to an instruction set in the flow table on a packet that enters the forwarding node.

In the foregoing embodiment, by means of selecting different forwarding planes for gateway control planes that cannot coexist, a problem can be avoided that when separated deployment is performed on control planes but integrated deployment is performed on forwarding planes in a serving gateway and a data gateway, a conflict is generated among control policies accepted after a packet enters the forwarding planes.

Figure 4:
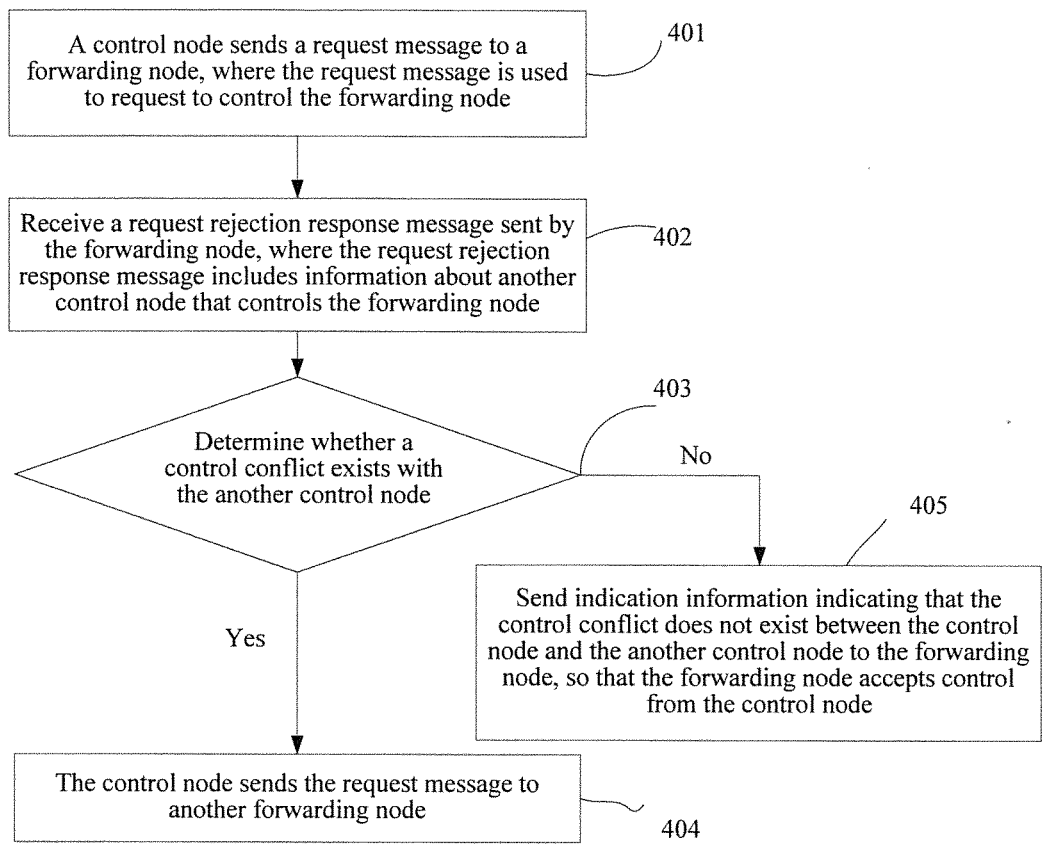
FIG. 4 is a flowchart of an embodiment of a processing method of a forwarding node according to an embodiment of the present invention.

Correspondingly, an embodiment of the present invention provides a processing method of a forwarding node. In this embodiment, the method is executed by a control plane of a gateway, such as a data gateway or a serving gateway. As shown in FIG. 4, the method includes:

401: A control node sends a request message to a forwarding node, where the request message is used to request to control the forwarding node.

Specifically, a control plane of a serving gateway or a data gateway may request to control a forwarding plane, which is also referred to as a forwarding node, by means of sending a registration request to the forwarding node.

402: The control node receives a request rejection response message sent by the forwarding node, where the request rejection response message includes information about another control node that controls the forwarding node.

403: The control node determines, according to the information about the other control node, whether a control conflict exists with the other control node.

Specifically, the control node may determine, according to the information about the other control node, whether the control node and the other control node serve a same user; and if they serve the same user, determine that the control conflict exists between the control node and the other control node; or if they do not serve the same user, determine that the control conflict does not exist between the control node and the other control node.

The control node may also determine, according to the information about the other control node, whether the control node and the other control node can coexist; and if they cannot coexist, determine that the control conflict exists between the control node and the other control node; or if they can coexist, determine that the control conflict does not exist between the control node and the other control node.

404: If the control node determines that the control conflict exists with the other control node, the control node sends the request message to another forwarding node.

405: If the control node determines that the control conflict does not exist with the other control node, the control node sends indication information indicating that the control conflict does not exist between the control node and the other control node to the forwarding node, so that the forwarding node accepts control from the control node.

After 405, if receiving a request acceptance response message from the forwarding node, the current control node delivers a flow table to the forwarding node, so that a packet of a user served by the control node is processed according to an indication in the flow table after the packet enters the forwarding node.

The following further provides detailed description about the foregoing embodiment with reference to an interaction diagram of a system.

In the embodiment in which the forwarding node determines, according to whether the forwarding node has been controlled by another control node, whether a control conflict exists on the forwarding node, a specific procedure is shown in FIG. 4, and is described as follows:

501: A first gateway control plane SGW-C sends a registration request to a first forwarding plane MF1, to request to set a node type of the first forwarding plane to a serving gateway type.

Specifically, the first gateway control plane may be used as a control node to send the registration request to the forwarding plane that is used as a forwarding node, to request to control the first forwarding plane MF1.

502: The first forwarding plane checks a current state, and if the node type of the first forwarding plane is not set, the MF1 sends a setting success response.

If the node type of the first forwarding plane has been set, it may be considered that the first forwarding plane has been controlled by another gateway control plane; and if the first forwarding plane further receives the registration request from the SGW-C, a control conflict occurs.

503: A second gateway control plane PGW-C also sends a registration request to the MF1, to request to set the node type of the first forwarding plane MF1 to a data gateway type.

504: The MF1 checks a current state of the node type and discovers that the current node type has been set to a serving node type, and therefore cannot receive the registration request from the PGW-C, and then the MF1 sends a setting failure response to the PGW-C.

505: After the PGW-C receives the setting failure message, the PGW-C needs to select another forwarding plane MF2 whose node type is not set, and sends a registration request again.

506: The MF2 sends a setting success response to the PGW-C, and in this case, the node type of the MF2 is set to the data gateway type.

507: The SGW-C and the PGW-C separately deliver a corresponding flow table for subsequent data transmission. Then, according to instructions in the flow tables delivered by the different control planes, a corresponding action is performed on a data packet that enters each forwarding plane.

Figure 6:
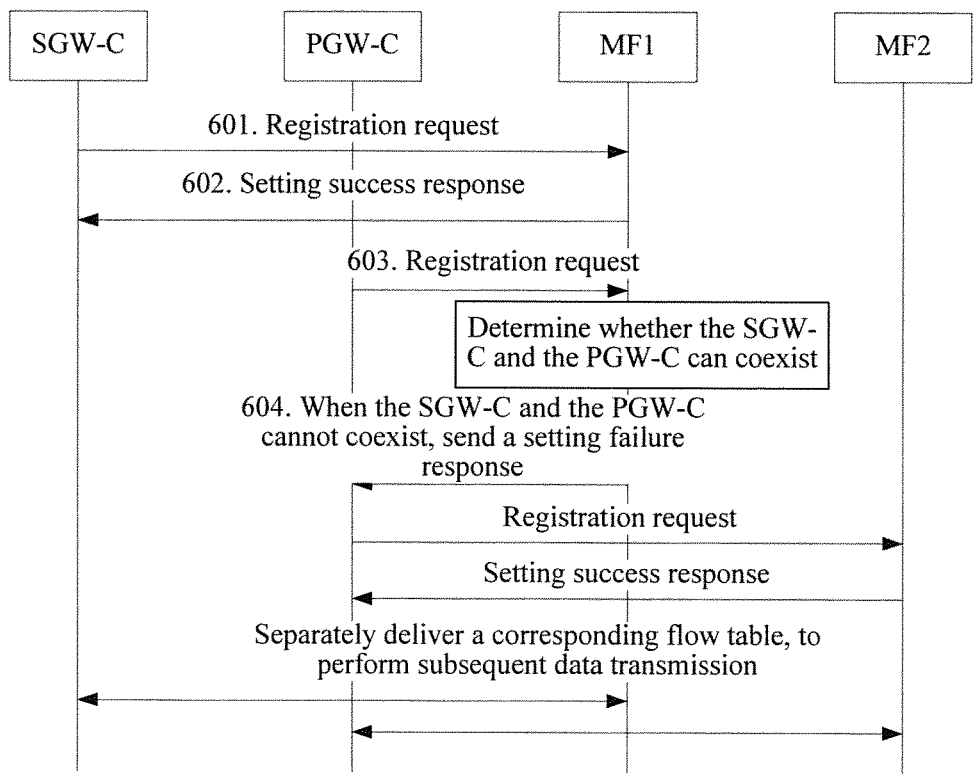
FIG. 6 is an interaction diagram of an embodiment of a processing method of a forwarding node according to an embodiment of the present invention.

The foregoing embodiment describes a manner in which one forwarding plane accepts control from only one gateway control plane, which can avoid a problem of a conflict that occurs when a same forwarding plane accepts control from different gateway control planes. For an implementation manner in which a same forwarding node may be controlled by two or more control nodes, refer to FIG. 6.

601: A first gateway control plane SGW-C sends a registration request to a first forwarding plane MF1, to request to set a node type of the MF1 to a serving gateway control type, and adds information about a gateway that can coexist with the first gateway control plane to the registration request.

602: The first forwarding plane MF1 checks a state of the MF1, and if a coexisting gateway is not set, the MF1 sends a setting success response.

603: A second gateway control plane PGW-C also needs to set the MF1 to a data gateway, and also sends a registration request to the MF1, to set the node type of the MF1 to a data gateway control type.

604: Herein the MF determines, according to whether the information about the gateway that coexists with the first gateway control plane includes the second gateway control plane, whether the first gateway control plane and the second gateway control plane can coexist. If the information about the gateway does not include the second gateway control plane, a setting failure message is sent; and on the contrary, if the information about the gateway includes the second gateway control plane, a setting success message is sent.

More specifically, the first gateway control plane SGW-C and the second gateway control plane PGW-C may also interact with each other, and whether the SGW-C and the PGW-C can coexist is determined according to whether the two serve a same access user.

If the second gateway control plane receives information about the setting failure response, the second gateway control plane PGW-C sends a registration request to another forwarding plane.

After the registration request from the second gateway control plane PGW-C succeeds, the SGW-C and the PGW-C separately deliver a corresponding flow table for subsequent data transmission.

Figure 5:
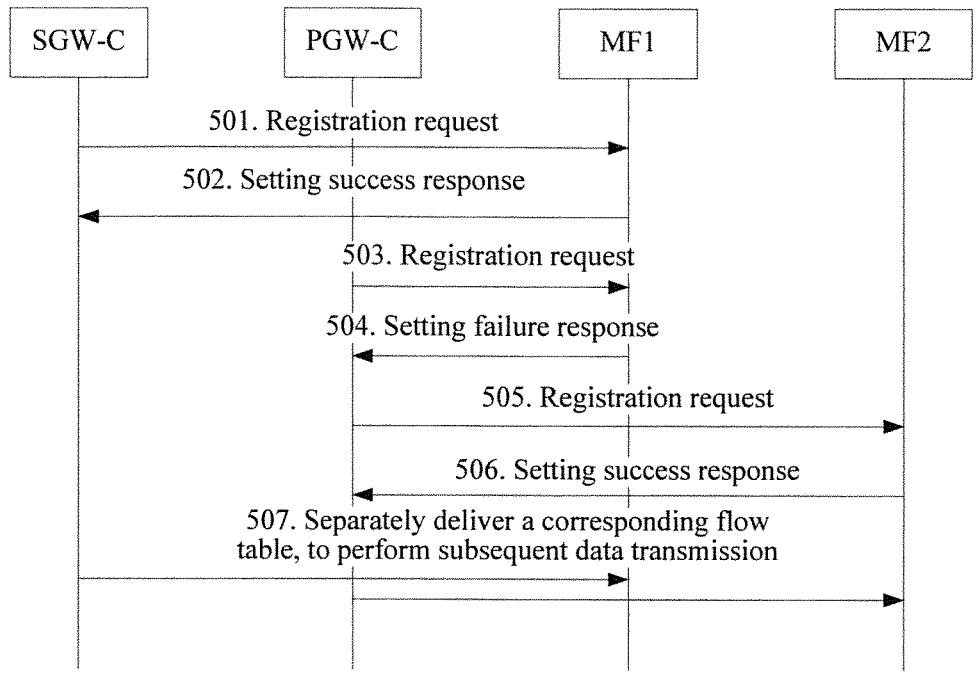
FIG. 5 is an interaction diagram of an embodiment of a processing method of a forwarding node according to an embodiment of the present invention.

A difference between this embodiment and the embodiment shown in FIG. 5 lies in that, as long as different control planes serve different access users, a same forwarding plane can accept control from the different control planes.

In the foregoing embodiment, by means of selecting different forwarding planes for gateway control planes that cannot coexist, a problem can be avoided that when separated deployment is performed on control planes but integrated deployment is performed on forwarding planes in a serving gateway and a data gateway, a conflict is generated among control policies accepted after a packet enters the forwarding planes.

Figure 7:
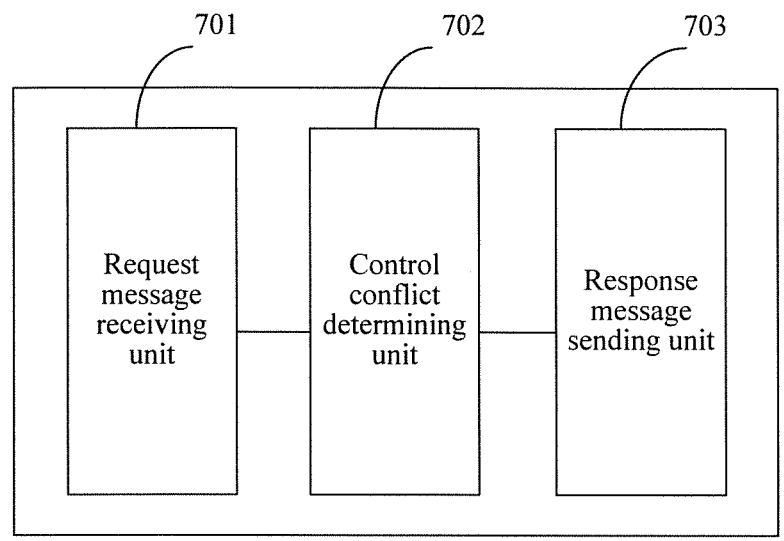
FIG. 7 is a structural diagram of an embodiment of a forwarding node according to an embodiment of the present invention.
Figure 8:
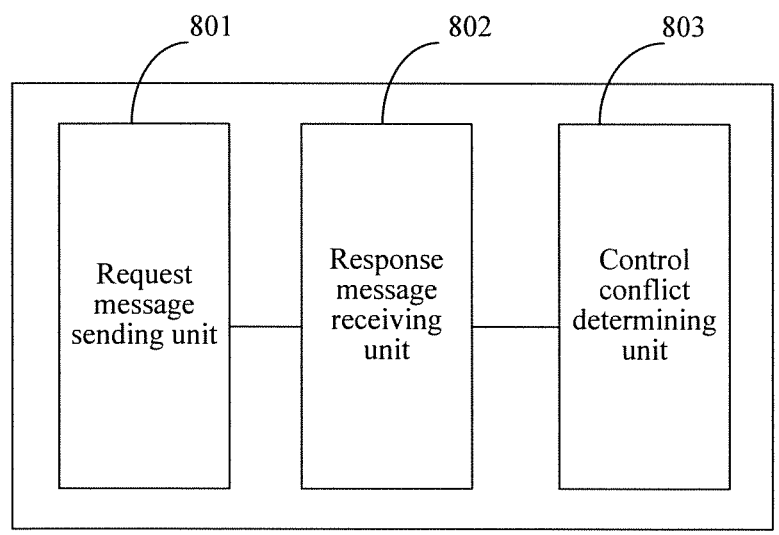
FIG. 8 is a structural diagram of an embodiment of a control node according to an embodiment of the present invention.
Figure 9:
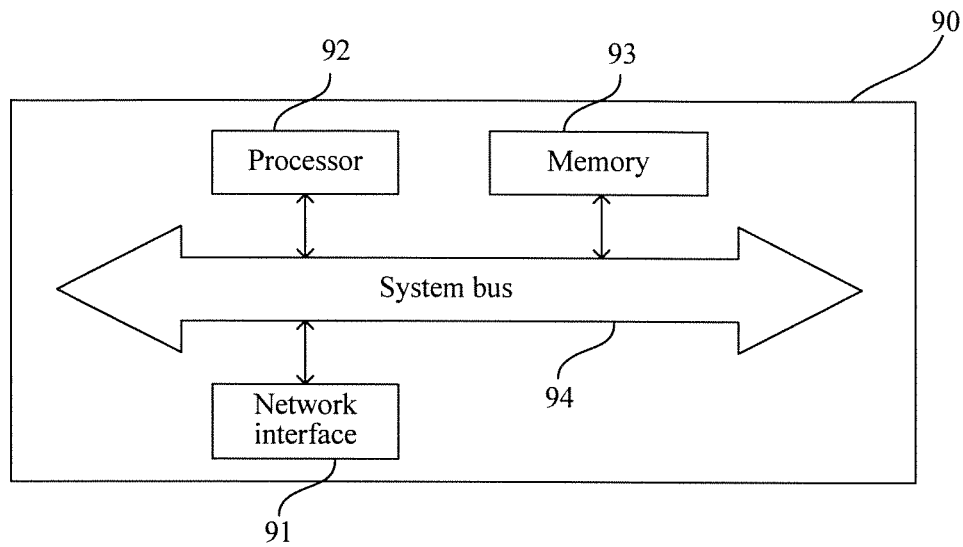
FIG. 9 is a structural diagram of an embodiment of a forwarding node according to an embodiment of the present invention.

Correspondingly, as shown in FIG. 7, an embodiment of the present invention provides a forwarding node 700. The forwarding node 700 includes:

a request message receiving unit 701, configured to receive a request message sent by a control node, where the request message is used to request to control the forwarding node;

a control conflict determining unit 702, configured to determine that a control conflict exists or the control conflict does not exist; and a response message sending unit 703, configured to:

if the control conflict exists, send a request rejection response message to the control node, so that the control node selects another forwarding node; or if the control conflict does not exist, send a request acceptance response message to the control node.

The control conflict determining unit 702 is specifically configured to:

when the forwarding node determines that the forwarding node is controlled by another control node, determine that the control conflict exists.

More specifically, the control conflict determining unit 702 is configured to:

when the forwarding node is controlled by the other control node, and the control node and the other control node serve a same user, determine that the control conflict exists; or when the forwarding node determines that the forwarding node is not controlled by another control node, determine that the control conflict does not exist.

In another implementation manner, the control conflict determining unit 702 is configured to:

when the forwarding node determines that the forwarding node is controlled by the other control node, if the control node and the other control node do not serve the same user, determine that the control conflict does not exist; or when the forwarding node and the other forwarding node can coexist, determine that the control conflict does not exist.

Correspondingly, an embodiment of the present invention provides a control node. The control node 800 includes:

a request message sending unit 801, configured to send a request message to a forwarding node, where the request message is used to request to control the forwarding node;

a response message receiving unit 802, configured to receive a request rejection response message sent by the forwarding node, where the request rejection response message includes information about another control node that controls the forwarding node; and a control conflict determining unit 803, configured to determine, according to the information about the other control node, whether a control conflict exists with the other control node, where if the control node determines that the control conflict exists with the other control node, the control node sends the request message to another forwarding node by using the request message sending unit.

In a first possible implementation manner, the control node further includes an indication information sending unit 804, configured to:

if the control node determines that the control conflict does not exist with the other control node, send indication information indicating that the control conflict does not exist between the control node and the other control node to the forwarding node, so that the forwarding node accepts control from the control node.

In an implementation manner, the control conflict determining unit 803 is configured to determine, according to the information about the other control node, whether the control node and the other control node serve a same user; and if they serve the same user, determine that the control conflict exists between the control node and the other control node; or if they do not serve the same user, determine that the control conflict does not exist between the control node and the other control node.

In another possible implementation manner, the control conflict determining unit 803 is configured to:

determine, according to the information about the other control node, whether the control node and the other control node can coexist; and if they cannot coexist, determine that the control conflict exists between the control node and the other control node; or if they can coexist, determine that the control conflict does not exist between the control node and the other control node.

Correspondingly, an embodiment of the present invention provides a forwarding node. The forwarding node 90 includes a network interface 91, a processor 92 and a memory 93. A system bus 94 is configured to connect the network interface 91, the processor 92 and the memory 93.

The network interface 91 is configured to communicate with another network element, for example, communicate with a control node.

The memory 93 may be a permanent memory, for example, a hard disk drive or a flash memory, and the memory 93 has a software module and a device driver. The software module is any functional module that can execute the foregoing method of the present invention; and the device driver may be a network driver or an interface driver.

The processor 92 invokes an application program physically stored in the memory 93, to execute an instruction of the following process:

receiving, by using the network interface 91, a request message sent by a control node, where the request message is used to request to control the forwarding node;

determining, by the processor 92, that a control conflict exists or the control conflict does not exist; and if the control conflict exists, sending, by the forwarding node, a request rejection response message to the control node by using the network interface 92, so that the control node selects another forwarding node; or if the control conflict does not exist, sending, by the forwarding node, a request acceptance response message to the control node by using the network interface 92.

In a possible implementation manner, the determining, by the processor 92, that a control conflict exists includes:

when the forwarding node determines that the forwarding node is controlled by another control node, determining, by the processor 92, that the control conflict exists; or when the forwarding node determines that the forwarding node is not controlled by another control node, determining, by the processor 92, that the control conflict does not exist.

Still further, in another embodiment, in a scenario in which two control nodes may jointly control a same forwarding node, when the forwarding node is controlled by the other control node, and the control node and the other control node serve a same user, the processor 92 determines that the control conflict exists; or when the forwarding node determines that the forwarding node is controlled by the other control node, if the control node and the other control node do not serve a same user, the processor 92 determines that the control conflict does not exist.

Alternatively, in another possible implementation manner, when the forwarding node and the other forwarding node can coexist, the processor 92 determines that the control conflict does not exist.

Figure 10:
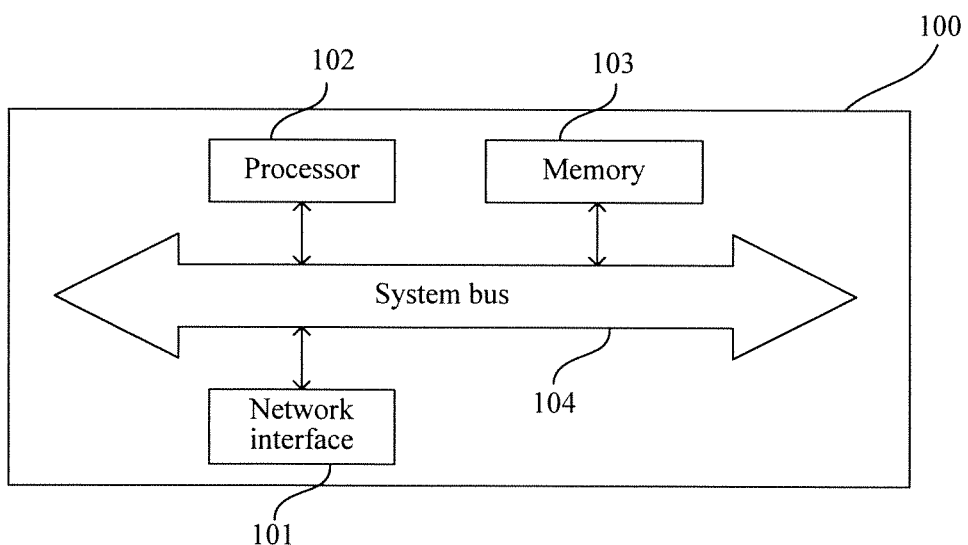
FIG. 10 is a structural diagram of an embodiment of a control node according to an embodiment of the present invention.

Correspondingly, an embodiment of the present invention provides a control node. As shown in FIG. 10, the control node 100 includes a network interface 101, a processor 102 and a memory 103, where the network interface is configured to communicate with another network element.

This embodiment includes the network interface 101, the processor 102 and the memory 103. A system bus 104 is configured to connect the network interface 101, the processor 102 and the memory 103.

The network interface 101 is configured to communicate with another network element, for example, a forwarding node.

The memory 103 may be a permanent memory, for example, a hard disk drive or a flash memory, and the memory 103 has a software module and a device driver.

The processor 102 invokes an application program physically stored in the memory 103, to execute an instruction of the following process:

sending a request message to a forwarding node by using the network interface 101, where the request message is used to request to control the forwarding node;

receiving, by using the network interface 101, a request rejection response message sent by the forwarding node, where the request rejection response message includes information about another control node that controls the forwarding node;

determining, by the processor 102 according to the information about the other control node, whether a control conflict exists with the other control node; and if determining that the control conflict exists with the other control node, sending, by the processor 102, the request message to another forwarding node by using the network interface 101.

In a possible implementation manner, if determining that the control conflict does not exist with the other control node, the processor 102 sends, by using the network interface 101, indication information indicating that the control conflict does not exist between the control node and the other control node to the forwarding node, so that the forwarding node accepts control from the control node.

Further, the determining, by the processor 102 according to the information about the other control node, whether a control conflict exists with the other control node includes:

determining, by the processor 102 according to the information about the other control node, whether the control node and the other control node serve a same user; and if they serve the same user, determining that the control conflict exists between the control node and the other control node; or if they do not serve the same user, determining that the control conflict does not exist between the control node and the other control node.

Still further, the determining, by the processor 102 according to the information about the other control node, whether a control conflict exists with the other control node includes:

determining, by the processor 102 according to the information about the other control node, whether the control node and the other control node can coexist; and if they cannot coexist, determining that the control conflict exists between the control node and the other control node; or if they can coexist, determining that the control conflict does not exist between the control node and the other control node.

In the foregoing embodiments, a problem of how to process a conflict occurring after a same forwarding plane receives flow tables that are corresponding to a same user and are delivered by different control planes is resolved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAN), a memory, a read-only memory (RUM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the principle of the present invention should fall within the protection scope of the present invention.

What is claimed is:

1. A processing method of a forwarding node, the method comprising:
   receiving, by a forwarding node, a request message sent by a control node, wherein the request message is used as a request to set a node type of the forwarding node, wherein the node type is one of a serving gateway type or a data gateway type, and the control node is one of a serving gateway control node (SGW-C) or a packet data network gateway control node (PGW-C);
   determining, by the forwarding node, that a control conflict exists or the control conflict does not exist by determining if the node type of the forwarding node has already been set;
   if the control conflict exists, sending, by the forwarding node, a request rejection response message to the control node, so that the control node selects another forwarding node; or
   if the control conflict does not exist, sending, by the forwarding node, a request acceptance response message to the control node;
   wherein determining, by the forwarding node, that a control conflict exists comprises:
      when the forwarding node determines that the node type of the forwarding node has already been set by another control node, determining, by the forwarding node, that the control conflict exists;
   wherein when the node type of the forwarding node has already been set by the other control node, determining, by the forwarding node, that the control conflict exists comprises:
      when the forwarding node is controlled by the other control node, and the request message indicates that the control node and the other control node serve a same user, determining, by the forwarding node, that the control conflict exists; and
   wherein the request rejection response message indicates that the control node and the other control node serve a same user.

2. The method according to claim 1, wherein determining, by the forwarding node, that the control conflict does not exist comprises:
   when the forwarding node determines that the forwarding node has not already been set by another control node, determining, by the forwarding node, that the control conflict does not exist.

3. The method according to claim 1, wherein determining, by the forwarding node, that the control conflict does not exist comprises:
   when the forwarding node determines that the node type of the forwarding node has already been set by the other control node, if the control node and the other control node do not serve the same user, determining, by the forwarding node, that the control conflict does not exist.

4. The method according to claim 1, wherein determining, by the forwarding node, that the control conflict does not exist comprises:
   determining from the request message, with the forwarding node, if the control node and the other control node can coexist; and
   when the control node and the other control node can coexist, determining, by the forwarding node, that the control conflict does not exist.

5. A processing method of a forwarding node, the method comprising:
   sending, by a control node, a request message to a forwarding node, wherein the request message is used as a request to set a node type of the forwarding node, wherein the node type is one of a serving gateway type or a data gateway type, and the control node is one of a serving gateway control node (SGW-C) or a packet data network gateway control node (PGW-C);
   determining, with the forwarding node, that the node type of the forwarding node has already been set by another control node;
   receiving, by the control node, a request rejection response message sent by the forwarding node, wherein the request rejection response message comprises information about the another control node that set the node type of the forwarding node;
   determining, by the control node according to the information about the other control node, whether a control conflict exists with the other control node, comprising:
      determining whether the control node and the other control node serve a same user;
      when the control node and the other control node serve the same user, determining that the control conflict exists between the control node and the other control node, or
      when the control node and the other control node do not serve the same user, determining that the control conflict does not exist between the control node and the other control node; and
   when the control node determines that the control conflict exists with the other control node, sending, by the control node, the request message to another forwarding node.

6. The method according to claim 5, further comprising:
when the control node determines that the control conflict does not exist with the other control node, sending, by the control node, indication information indicating that the control conflict does not exist between the control node and the other control node to the forwarding node, so that to enable the forwarding node accepts to accept control from the control node.

7. The method according to claim 5, wherein determining, by the control node according to the information about the other control node, whether a control conflict exists with the other control node comprises:
determining, by the control node according to the information about the other control node, whether the control node and the other control node can coexist; and
if the control node and the other control node cannot coexist, determining that the control conflict exists between the control node and the other control node, or
if the control node and the other control node can coexist, determining that the control conflict does not exist between the control node and the other control node.

8. A forwarding node, comprising:
a network interface, a memory and a processor, wherein the network interface is configured to communicate with another network element; and
wherein the processor invokes an application program physically stored in the memory, to execute one or more instructions to perform the following process:
receiving, by using the network interface, a request message sent by a control node, wherein the request message is used as a request to set a node type of the forwarding node, wherein the node type is one of a serving gateway type or a data gateway type, and the control node is one of a serving gateway control node (SGW-C) or a packet data network gateway control node (PGW-C),
determining that a control conflict exists or the control conflict does not exist by determining if the node type of the forwarding node has already been set,
if the control conflict exists, sending a request rejection response message to the control node by using the network interface, so that the control node selects another forwarding node; or
if the control conflict does not exist, sending a request acceptance response message to the control node by using the network interface;
wherein determining, by the processor, that a control conflict exists comprises:
when the forwarding node determines that the node type of the forwarding node has already been set by another control node, determining, by the processor, that the control conflict exists;
wherein when the node type of the forwarding node has already been set by the other control node, determining, by the processor, that the control conflict exists comprises:
when the node type of the forwarding node has already been set by the other control node, and the control node and the other control node serve a same user, determining, by the processor, that the control conflict exists.

9. The forwarding node according to claim 8, wherein determining, by the processor, that the control conflict does not exist comprises:
when the forwarding node determines that the node type of the forwarding node has not already been set by another control node, determining, by the processor, that the control conflict does not exist.

10. The forwarding node according to claim 8, wherein determining, by the processor, that the control conflict does not exist comprises:
when the forwarding node determines that the node type of the forwarding node has already been set by the other control node, if the control node and the other control node do not serve the same user, determining, by the processor, that the control conflict does not exist.

11. The forwarding node according to claim 8, wherein determining, by the processor, that the control conflict does not exist comprises:
when the forwarding node and the other forwarding node can coexist, determining, by the processor, that the control conflict does not exist.

12. A control node, comprising:
a network interface, a memory and a processor, wherein the network interface is configured to communicate with another network element; and
wherein the processor invokes an application program physically stored in the memory, to execute one or more instructions to perform the following process:
sending a request message to a forwarding node by using the network interface, wherein the request message is used as a request to set a node type of the forwarding node, wherein the node type is one of a serving gateway type or a data gateway type, and the control node is one of a serving gateway control node (SGW-C) or a packet data network gateway control node (PGW-C),
determining, with the forwarding node, that the node type of the forwarding node has already been set by another control node,
receiving, by using the network interface, a request rejection response message sent by the forwarding node, wherein the request rejection response message comprises information about another control node that set the node type of the forwarding node,
determining, according to the information about the other control node, whether a control conflict exists with the other control node, comprising:
determining whether the control node and the other control node serve a same user;
when the control node and the other control node serve the same user, determining that the control conflict exists between the control node and the other control node, or
when the control node and the other control node do not serve the same user, determining that the control conflict does not exist between the control node and the other control node; and
when determining that the control conflict exists with the other control node, sending the request message to another forwarding node by using the network interface.

13. The control node according to claim 12, wherein the processor further executes one or more instructions to perform the following process:
when determining that the control conflict does not exist with the other control node, sending, by using the network interface, indication information indicating that the control conflict does not exist between the control node and the other control node to the forwarding node to enable the forwarding node to accept control from the control node.

14. The control node according to claim 12, wherein determining, by the processor according to the information about the other control node, whether a control conflict exists with the other control node comprises:
- determining, by the processor according to the information about the other control node, whether the control node and the other control node can coexist; and
- if the control node and the other control node cannot coexist, determining that the control conflict exists between the control node and the other control node, or
- if the control node and the other control node can coexist, determining that the control conflict does not exist between the control node and the other control node.

* * * * *